Oct. 20, 1959   V. M. KRAMER ET AL   2,909,198
SPIRALLY CORRUGATED RUBBER TUBING WITH
INTEGRAL CYLINDRICAL END CONNECTORS
Filed June 9, 1955
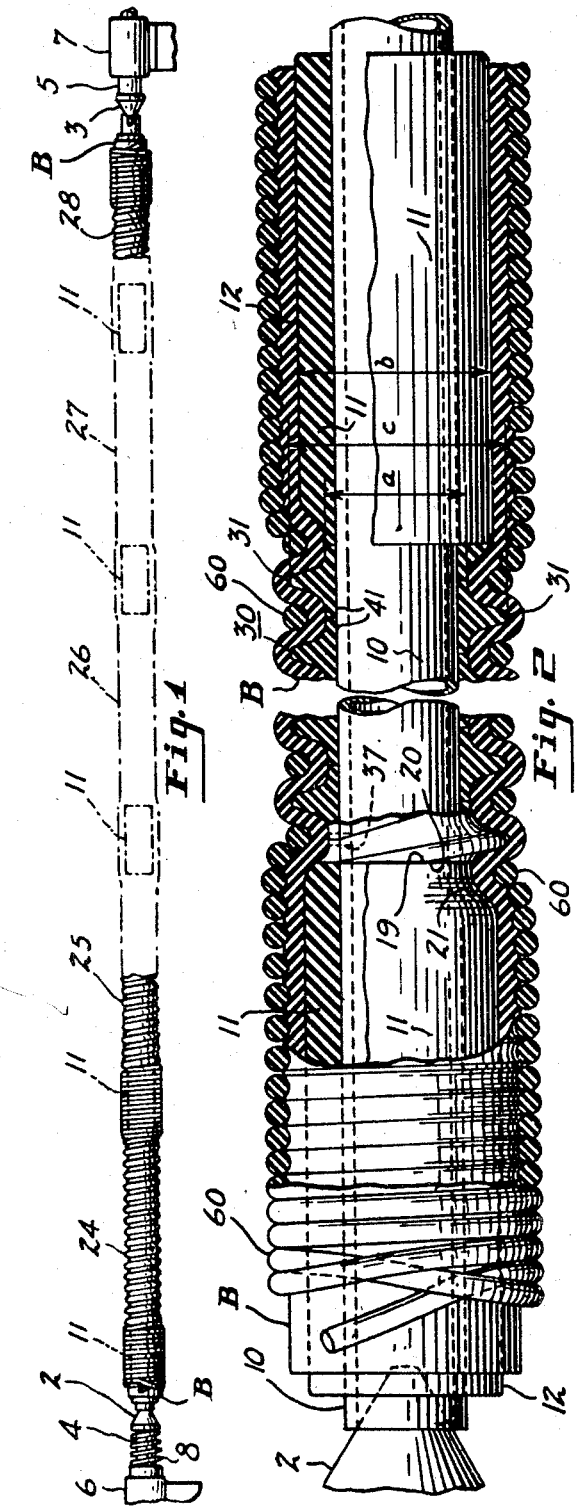
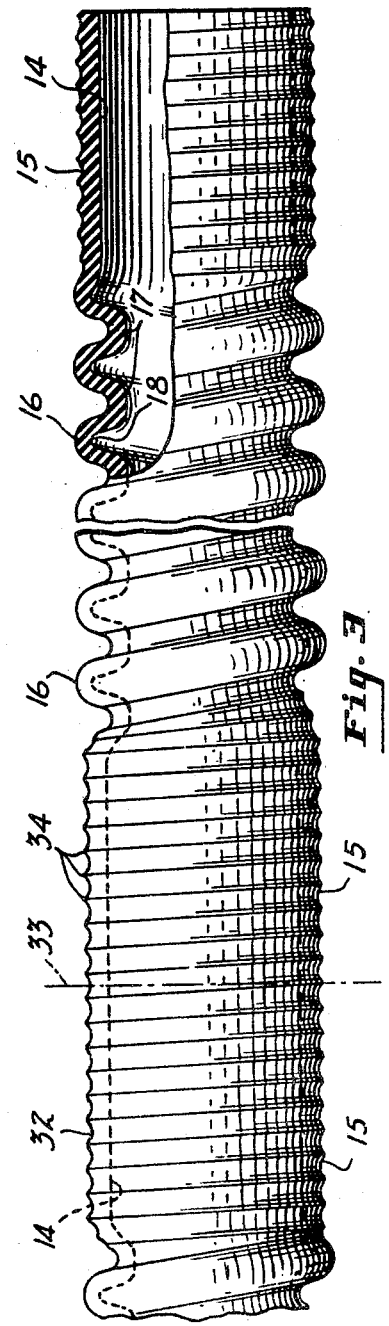
INVENTORS
*Vance M. Kramer*
*Lawrence W. Carlton*
BY *Schramm and Knowles*
ATTORNEYS United States Patent Office 2,909,198
Patented Oct. 20, 1959

2,909,198

SPIRALLY CORRUGATED RUBBER TUBING WITH INTEGRAL CYLINDRICAL END CONNECTORS

Vance M. Kramer, Shaker Heights, and Lawrence W. Carlton, North Baltimore, Ohio

Application June 9, 1955, Serial No. 514,312

4 Claims. (Cl. 138—49)

This invention relates to spiral corrugated flexible rubber tubing. More specifically, the invention is concerned with such tubing wherein the tubing is provided with cylindrical end portions which constitute connectors for attaching the tubing to a cylindrical spigot or pipe.

In many uses of tubing as a fluid conduit it is connected between metal pipes or tubular spigots of cylindrical or other uniform sections. Cylindrically shaped rubber tubing made as by extrusion or by assembly on a cylindrical mandrel is readily attached to cylindrical metal spigots or pipes by effecting telescopic joints. Corrugated rubber tubing, however, can be attached to cylindrical pipe ends or spigots only with some difficulty, especially when it is desired to obtain a fluid tight joint.

Corrugated rubber tubing made by a cording process in which a raw rubber tube blank is conformed to the shape of an internal mandrel by a tensile cord element wrapped spirally about the outside of the assembly presents a particularly difficult problem in connection with the provision of adequate cylindrical end connectors.

It has been proposed to mold cylindrical end portions on corrugated tubes, the cylindrical tube ends being used as connectors that are received telescopically over the metal conduit ends. It has also been proposed to attach a cylindrically shaped rubber tube portion on the end of a corrugated rubber tube by cement or vulcanization to provide a connector that is receivable telescopically over a cylindrical metal conduit end. Molding of cylindrical end connectors on preformed spiral corrugated tubing has been done, but must be accomplished in separate and therefore costly operations. The molding and cementing of cylindrical end portions or connectors thus has not been entirely satisfactory because of the expense involved and the difficulty of obtaining good joints.

It is therefore one of the principal objects of the present invention to provide an improved spirally corrugated rubber tube having integral cylindrical end portions for attachment of the tubing to cylindrical metal conduit ends as by telescopic joints. More particularly the invention is concerned with spiral corrugated tubing of the type made by a cording process in which integral cylindrical end connectors of the tubing are shaped and cured at the same time as the corrugated section or sections of the tubing.

Another object of the invention is to provide integral end connectors on rubber tubing, which connectors have smooth cylindrical internal surfaces and charactered external surfaces that facilitate manipulation of the tube end connectors in attaching the tubing to metal pipes and spigots.

Other objects and advantages will become apparent from the following detailed description which represents the best known mode of practicing the invention. This description is made in connection with the accompanying drawing forming a part of the specification.

In the drawings:

Fig. 1 is a fragmentary elevational view partly diagrammatic and with parts broken away and removed of rubber tubing corded in place on an elongated internal mandrel mounted between the supporting end cones of a cording machine;

Fig. 2 is an enlarged foreshortened fragmentary elevational detail partly in section corresponding to part of the left hand end of Fig. 1 and showing the hollow internal form, spiral core strip sections, cylindrical sleeve sections, tube blank and cord;

Fig. 3 is a fragmentary foreshortened elevational detail showing a portion of molded spirally corrugated flexible tubing with integral cylindrical end connectors after removal of the cured tubing from the forming mandrel.

The present invention is a variation of that set forth in co-pending application for United States Patent Serial No. 381,258, filed September 21, 1953, now Patent 2,832,096, dated April 29, 1958, of which this is a continuation in part.

The present tube comprises a corrugated center or body portion and integrally connected cylindrical end portions. The latter are useful in attaching the corrugated tube sections to cylindrical spigots in use, say, as radiator hoses of automobiles.

In Fig. 1 is shown an elongated corrugated rubber tube of alternating corrugated and cylindrical sections, this tube being corded in place on the internal mandrel or form on which it is shaped and cured. The building up of the mandrel, the drawing thereover of the extruded cylindrically shaped raw rubber tube blank and the cording of the blank to form the corrugations follows generally the procedure and utilizes the apparatus described in the co-pending application referred to, with certain variations and changes apparent to those skilled in the art or set forth herein. Referring to Fig. 1 the tube-mandrel assembly is shown mounted, say, between the supporting cones 2 and 3 which correspond to the cones of the cording apparatus illustrated in Fig. 1 of the co-pending case. Thus Fig. 1 may be taken to represent the completion of the cording operation in which the cord 60 has been wrapped spirally about the tube blank with the latter supported internally on the composite form or mandrel. The arrangement of the mandrel is shown more particularly in Fig. 2 which represents a relatively enlarged view of the assembly of Fig. 1 with parts broken away and in section to illustrate the internal construction.

The mandrel comprises an elongated main support member 10 which takes the form of a circular sectioned steel tube into the ends of which are received the supporting cones 2 and 3 of the cording machine. One of the cones, say the right-hand cone of Fig. 1, is power driven, as shown in the patent application referred to, and has a driving connection with the end of the mandrel tube 10 so as to rotate the latter in either forward or reverse direction at the will and under the control of the operator and at variable speed, also under control of the operator.

Extruded rubber core strips 30 are wrapped spirally about and cemented in place on axially spaced portions of the mandrel tube 10. These core strips correspond to the core strip 30 of the patent application mentioned and are alike in shape, height and manner of placement. They provide the desired corrugated surfaces about which is drawn an extruded raw or partially cured tubular blank B ready to be shaped to the desired corrugated configuration in a manner similar to that described in the patent application referred to. At points spaced along the length of the supporting tube 10 where the core strip 30 is omitted, and in lieu thereof, there is employed a series of filler members 11 which may comprise extruded rubber tubes or sleeves that are received over the ends of the tube 10 in assembly and are slid axially into place. The sleeve members 11 are molded so that in their unstressed condition their internal diameter is slightly less than that of the supporting tube 10. Thus in assembling the sleeve members onto the tube 10 the sleeves are slightly distended and frictionally grip the metal tube. Additionally the tube surface or the internal surfaces of the sleeves, or both such surfaces may be treated with a suitable adhesive agent or cement for bonding the sleeves in place.

Each spacer sleeve 11 has an external cylindrical surface 12 which, when the spacer tube member is mounted on the mandrel tube 10, is of less diameter (diameter $b$) than the cylinder (of diameter $c$) generated by crests 31 of the spiral core strips 30. The diameter of the cylindrical surfaces 12 of the spacer sleeves is, however, greater than the cylinder (diameter $a$) generated by the outside surfaces of the core strip flanges 41. Thus when the tube blank B is corded into place about the composite mandrel or form and cured, internal cylindrical surfaces 14 of tube connector portions 15, which are integrally joined to corrugated tube portions 16, are of an intermediate diameter. That is to say, the internal cylindrical surfaces 14 of the tubing connector ends are of greater diameter $b$ than the cylinder (diameter $a$) generated by tubing internal surface portions 17 that define the minimum passage through the tubing, while yet being of less diameter than the cylinder (diameter $c$) generated by bottom 18 of the internal spiral groove which defines the corrugations. This relationship of the internal diameter of the end connectors to the diameters of the cylinders generated by the minimum diameter surface portions 17 and the groove bottoms 18 provides an efficient construction particularly adapted to automotive radiator hoses. The effective clear flow minimum passage diameter through the corrugated portion or section of the tubing is the diameter of the cylinder generated by the internal surface portions 17. In practice this diameter is made approximately ¼ inch less than the diameter of the internal cylindrical surfaces 14 of the end connector portions 15, so that when the latter are received over a cylindrical metal spigot of an engine water pump housing or the like having a wall thickness of approximately ⅛ inch, the clear flow passage through the corrugated portion of the housing is approximately equal to the area of the fluid passage in the spigot.

The ends of each section of the spiral core strip 30 are tapered or skived in the provision of radial end faces normal to the mandrel axis to form smooth junctures with radial end faces 19 of the cylindrical core sleeves 11. Thus each end of each core strip 30 is formed with a surface 20 which is diagonal to the centerline of the strip and is received flatwise against one of the tube end surfaces 19, the meeting surfaces being in a radial plane through the mandrel. Cement and filler material are used in assembly to secure the parts together and to fill any cracks or voids in the provision of a smooth juncture between the parts. Portions of the shoulders at the ends of the core sleeves 11 are removed as by abrading or carving to blend the external cylindrical surfaces of the core sleeves gradually into the corrugated external contours provided by the core strips 30. The contoured end portions of the sleeves 11 are indicated at 21 of Fig. 2.

In the curing of the tubing the tightly wound cord 60 maintains compressive radial forces on the cylindrical connector portions 15 and in effect forms an external mold which confines the rubber during curing. The softening of the rubber tube blank B in the curing heat causes the rubber to flow into and take the shape of the shallow spiral groove formed between the adjacent convolutions of the circular sectioned cord 60. The curing of the rubber while thus confined by the spirally wound cord results in the formation of an external corrugated surface, shown at 32 along the entire length of each of the end connector tubing portions 15.

After the cured tube has been cooled and the cord 60 removed as by unwrapping, the cured tube blank is withdrawn axially off the internal mandrel or form. The introduction of air under pressure between the tube and the mandrel or form facilitates this withdrawal process. The several sections 24—28 of corrugated tubing are severed from one another as by cutting radially through the mid-points of each of the connector tube portions 15, as along transverse radial lines one of which is indicated at 33, Fig. 3. The cutting of full length tubing into its constituent sections thus is preferably done after the tubing is removed from the internal mandrel since the removal is difficult unless the tubing is inflated in place to permit the corrugations to clear the ridges 31 of the core strips 30.

In forming the generally cylindrical end connectors 15 integrally on the corrugated tubing sections there is eliminated the costly secondary processing heretofore required in attaching or molding end connectors onto sections of spiral tubing cut from a longer piece. The use of the spacer sleeves 11 that are slidable along the mandrel tube 10 in assembly permits internal diameter $b$ of the cylindrical end connectors to be chosen to fit the particular requirements of the application for which the tubing is being produced. Some of the sleeves 11 may be of different lengths and different diameters than others of the sleeves so that the end connectors 15 are of different lengths and diameter. In the preferred arrangement, however, and as mentioned previously, the internal diameter $b$ of the cylindrical end connector is intermediate the diameter $c$ which represents the diameter of the cylinder generated by the crests or ridges 45 of the spiral core strips 30 and the diameter $a$ which represents the diameter of the "clear flow" cylinder generated by those internal surface portions of the corrugated section of the tubing which are closest to the tubing axis.

The external surface 32 of the tubing end connectors 15 is characterized by relaitvely shallow spiral ridges or crests 34 which are formed by the flow of the soft rubber into the spiral cracks between the adjacent convolutions of the cord 60. The ridges 34 provide a charactered surface on each connector portion which facilitates the manual gripping required in working the tube end connectors into place over the metal pipe connectors or spigots. Internal cylindrical surfaces of the connectors 15 are smooth for sliding over and sealing against the pipe connectors.

The present invention thus provides a new and improved rubber tubing construction having in combination a central corrugated section and integral generally cylindrical tubular end connector sections. The present tubing is especially useful as the connecting conduit or conduits between an automobile radiator and engine, although it is apparent the tubing can be put to other uses.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What we claim and desire to secure by Letters Patent of the United States is:

1. A flexible rubber tube comprising a body portion formed with a uniform internal and external spiral corrugation and an attaching end portion integral with the body portion, the end portion having a smooth internal surface and an external corrugated surface, said external corrugated surface extending along the entire length of the attaching portion and comprising a continuous helical groove and a continuous helical ridge, convolutions of the groove alternating with convolutions of the ridge, the groove being defined by a concave surface which extends in a continuous arcuate curve between adjacent convolutions of the ridge, and the ridge including an angular crest formed by the intersection of marginal portions of the concave surfaces of adjacent groove convolutions.

2. A flexible rubber tube comprising a body portion formed with a uniform internal and external spiral corrugation and an attaching end portion integral with the body portion, the end portion having a smooth internal surface and an external corrugated surface, the corrugations on the end portion of the tube being shallower than on the body portion, said external corrugated surface extending along the entire length of the attaching portion and comprising a continuous helical groove and a continuous helical ridge, convolutions of the groove alternating with convolutions of the ridge, the groove being defined by a concave surface which extends in a continuous arcuate curve between adjacent convolutions of the ridge, and the ridge including an angular crest formed by the intersection of marginal portions of the concave surfaces of adjacent groove convolutions.

3. A flexible tube comprising a corrugated rubber body of substantially uniform wall thickness formed with uniform continuous relatively deep internal and external spiral ribs and grooves and an integral connector portion having a continuous relatively shallow spiral external rib and groove formation and a smooth internal surface, the convolutions of the rib alternating with the convolutions of the groove on the connector portion, the connector portion having and the groove thereon being defined by a concave surface which extends in a continuous arcuate curve between adjacent convolutions of the ridge, the connector portion having and the rib thereon including a crest formed by the intersection of marginal portions of the concave surface of adjacent groove convolutions, the pitch of the shallow connector portion rib being less than the pitch of the rib on the body portion, and the depth of connector portion groove being less than the depth of the body portion groove in the provision of a spiral charactered gripping surface on the connector portion, whereby manual gripping of the connector portion in assembling it to a fitting or the like is facilitated.

4. A flexible tube comprising a corrugated rubber body of substantially uniform wall thickness formed with uniform continuous relatively deep internal and external spiral ribs and grooves and an integral connector portion having a continuous relatively shallow spiral external rib and groove formation and a smooth internal surface, the convolutions of the rib alternating with the convolutions of the groove on the connector portion, the connector portion having and the groove thereon being defined by a concave surface which extends in a continuous arcuate curve between adjacent convolutions of the ridge, the connector portion having and the rib thereon including a crest formed by the intersection of marginal portions of the concave surface of adjacent groove convolutions, the radial depth of both the internal and the external body ribs being greater than and of the connector portion rib being less than the thickness of the tube wall, and the pitch of the rib and groove on the connector portion being less than that of the ribs and grooves of the body.

References Cited in the file of this patent
UNITED STATES PATENTS

| | | |
|---|---|---|
| 1,547,431 | Mallory | July 28, 1925 |
| 1,864,861 | Schaller | June 28, 1932 |
| 2,009,075 | Thompson | July 22, 1935 |
| 2,364,332 | Wilkinson | Dec. 5, 1944 |
| 2,371,991 | Harding | Mar. 20, 1945 |
| 2,430,081 | Roberts et al. | Nov. 4, 1947 |
| 2,539,853 | Meyers et al. | Jan. 30, 1951 |
| 2,542,170 | Weeks | Feb. 20, 1951 |
| 2,570,259 | McKinley | Oct. 9, 1951 |
| 2,582,249 | Hendel | Jan. 15, 1942 |
| 2,730,480 | Brown | Jan. 10, 1950 |

UNITED STATES PATENT OFFICE
CERTIFICATE OF CORRECTION

Patent No. 2,909,198            October 20, 1959

Vance M. Kramer et al.

It is hereby certified that error appears in the above numbered patent requiring correction and that the said Letters Patent should read as corrected below.

Column 3, line 61, after "Fig. 2." insert the following paragraph:

> In the arrangement shown in Fig. 1 by way of example the internal core or mandrel is approximately 6 feet long and is provided with five corrugating sections 24-28, each defined by one of the spirally wound core strips 30.

Signed and sealed this 5th day of June 1962.

(SEAL)

Attest:
ERNEST W. SWIDER

Attesting Officer

DAVID L. LADD

Commissioner of Patents